Aug. 7, 1962 W. A. DERR ET AL 3,048,820

SUPERVISORY CONTROL APPARATUS

Filed July 31, 1957 2 Sheets-Sheet 1

Aug. 7, 1962 W. A. DERR ET AL 3,048,820

SUPERVISORY CONTROL APPARATUS

Filed July 31, 1957 2 Sheets-Sheet 2

3,048,820
Patented Aug. 7, 1962

3,048,820
SUPERVISORY CONTROL APPARATUS

Willard A. Derr, Pittsburgh, and William F. Cruess, Monroeville, Pa., assignors to Westinghouse Electric Corporation, East Pittsburgh, Pa., a corporation of Pennsylvania Filed July 31, 1957, Ser. No. 675,305
3 Claims. (Cl. 340—163)

Figure 1:
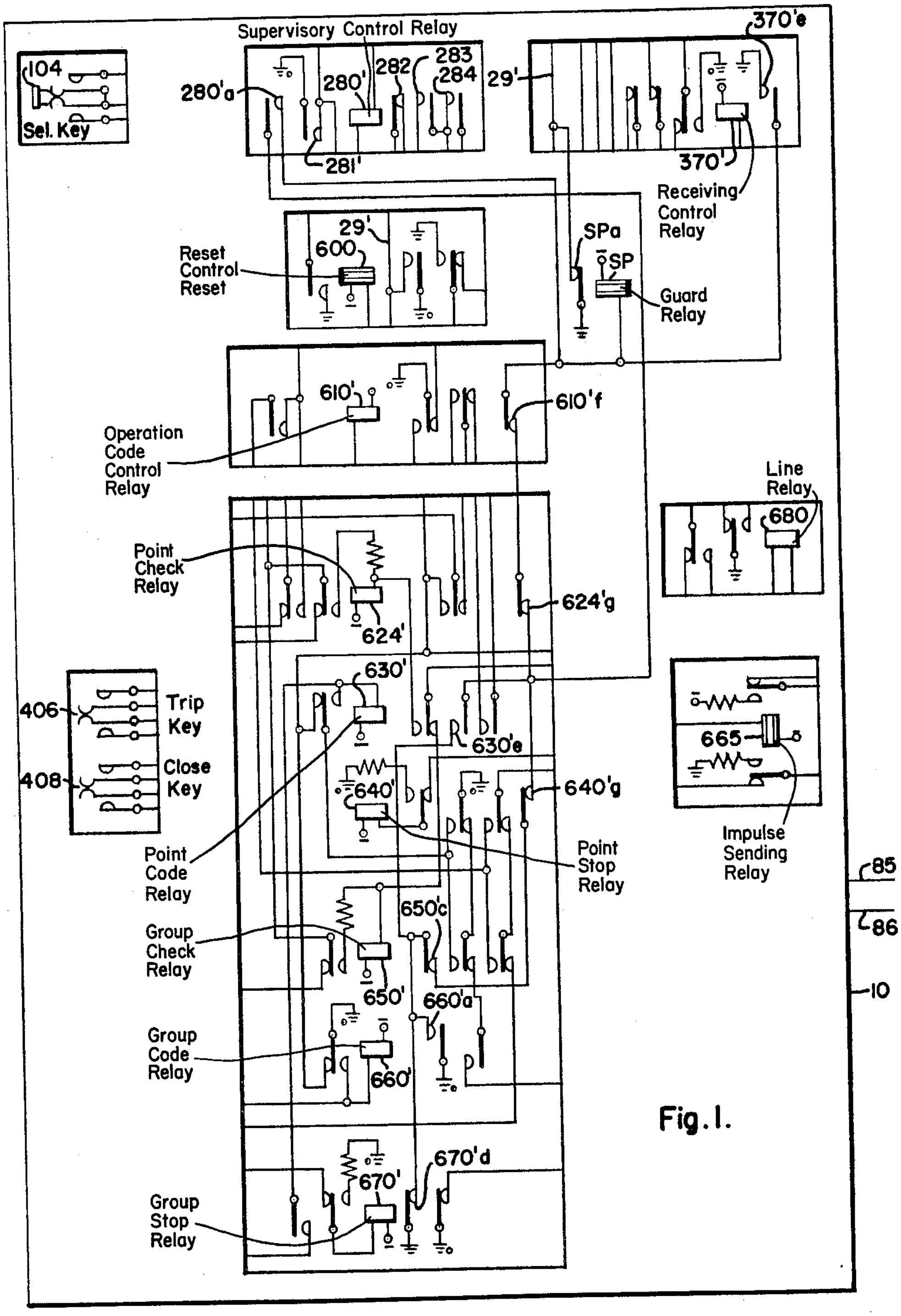

Our invention relates generally to remote control and indication apparatus and it has reference, in particular, to supervisory control systems and apparatus.

Generally stated, it is an object of our invention to provide improved supervisory control apparatus which is more reliable in operation.

More specifically, it is an object of our invention to provide in supervisory control apparatus, guard means which operates to reset the apparatus at any of a number of points in the operating sequence thereof if the subsequent operating step in the sequence does not occur within a predetermined timed interval.

Another object of our invention is to provide in supervisory control apparatus for initiating a reset operation at the end of each selection, operation, and indication code, and for preventing completion of such reset operation if a corresponding check code is received within a predetermined interval of time.

Another object of our invention is to provide for making supervisory control apparatus less susceptible of operation by spurious noise pulses which could accumulate over a period of time and produce a false signal, the same as a valid signal code.

Other objects will, in part, be obvious and will in part be explained hereinafter.

This invention relates to supervisory control equipment which operates by alternately transmitting signal codes back and forth between the control station and the remote station. In general, one station will transmit a code and then wait for the other station to respond with the next code in the series. In the equipment previously used, if, because of equipment or channel failure, a response is not received from the other station, the first station would wait indefinitely in a receiving condition. This equipment has been susceptible to false operation by noise pulses on the channel when it was left for a considerable time in this receiving condition.

One of the basic ideas behind our new circuit is that, once an operation has started, the equipment will be continuously trying to reset itself; and the various codes must be sent and received within a prescribed time of each other in order to hold off the automatic reset and keep the equipment operating. After a code is sent, the responding code from the other station must be received within a predetermined time or the equipment will reset and the entire operation will start over.

In practicing our invention in accordance with one of its embodiments, a guard relay is added to the supervisory apparatus at each of the dispatching and the remote substation, which relay is normally energized but is deenergized at the end of the group-selection code, the point-selection code, the operation code, and the supervision code. The guard relay is of the delayed-operation type and is arranged to complete an operating circuit for the reset control relay at the particular station to restore the apparatus thereat to a normal reset condition. If the succeeding function of the supervisory apparatus, such as reception of a group-selection check code, point-selection check code or supervision code, is performed within a predetermined timed interval, a hold circuit is established for preventing operation of the guard relay, and reset of the supervisory apparatus is prevented until the completion of the entire operation at which time it is effected in the normal manner.

Figure 2:
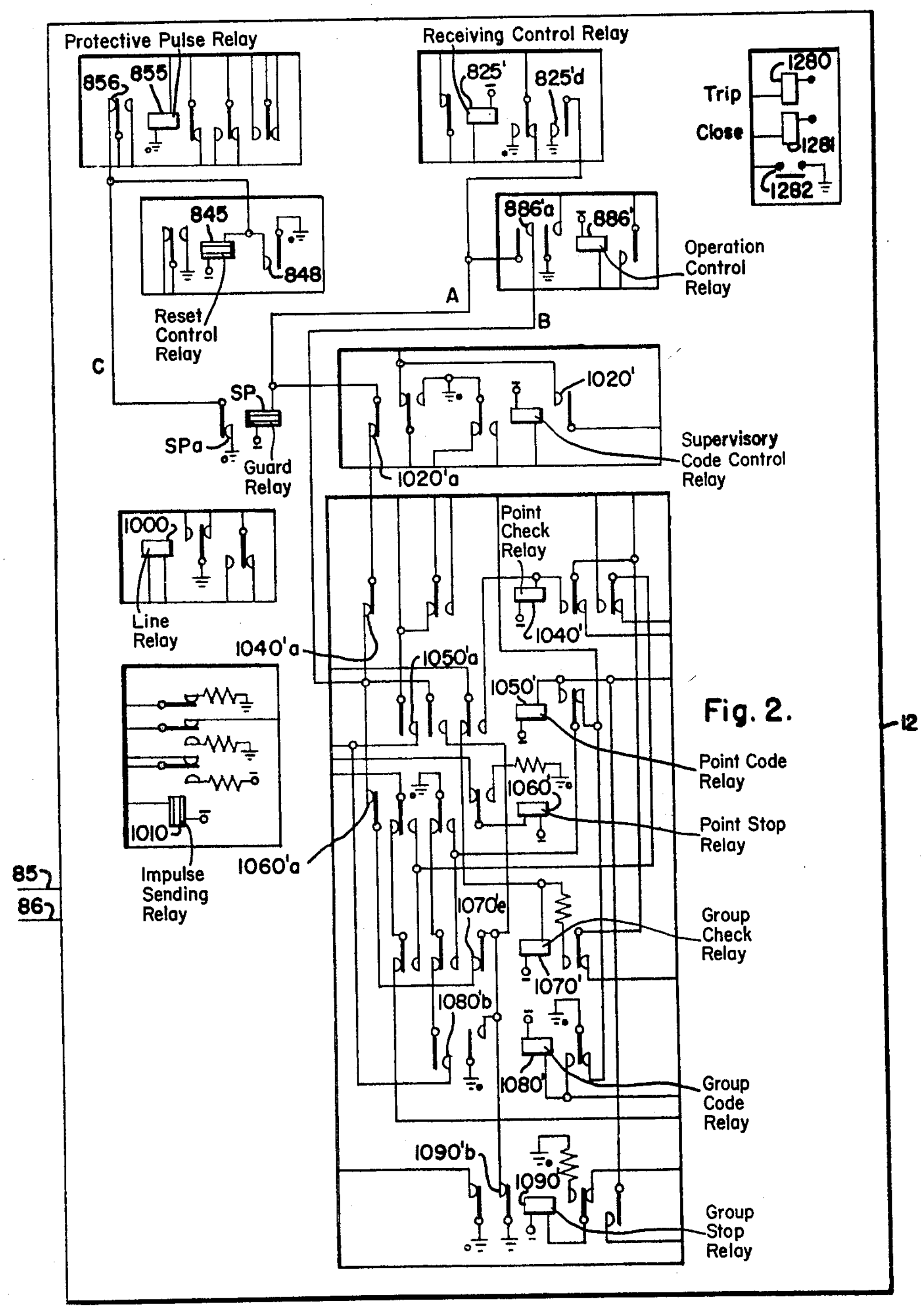

For a more complete understanding of the nature and scope of our invention, reference may be made to the following detailed description which may be read in connection with the accompanying drawings, in which:

FIG. 1 is a schematic diagram in part of the supervisory control apparatus at the dispatching office embodying the invention, and FIG. 2 is a schematic diagram in part of the supervisory control apparatus at a remote station embodying the invention.

Referring to FIGS. 1 and 2, the reference numerals 10 and 12 designate generally, the supervisory control apparatus at the dispatching office or control station and the remote substation, respectively. The apparatus at these stations is substantially identical with that shown and described in detail in Patent No. 2,616,959 issued November 4, 1952, to L. R. Breese et al., except for the changes hereinafter described to embody the present invention. The apparatus of FIGS. 1 through 7 of the Breese et al. patent is represented generally by the box 10, while the apparatus of FIGS. 8 through 12 of the Breese et al. patent is represented by box 12. For the purposes of simplification, the boxes 10 and 12 have been used to represent the overall apparatus at the dispatching office or control office and the remote substations. The individual relays and the circuits, being exactly as shown and described in the Breese et al. patent except as modified for the purposes of the present invention, are designated primarily by the same designations as in the Breese et al. patent but may be primed to indicate a change such as the addition of an armature or additional contacts or the like. Other apparatus which is shown in the present application for the purpose of describing the overall operation of the supervisory apparatus and which has not been changed in any respect, is designated by the same designation as in the Breese et al. patent. Apparatus added to that of the Breese et al. patent has been designated by designations not appearing in the Breese et al. patent so as to distinguish it therefrom. Those portions of the apparatus which have been changed or added to the Breese et al. patent, are shown in detail through the openings in the boxes 10 and 12.

Referring to FIG. 1 of the drawings, it will be seen that a guard relay SP which is of the delayed drop out type has been provided for controlling the operation of the reset control relay 600. An operating circuit for the reset control relay 600 is provided through back contact SP*a* of the guard relay SP for the reset control relay 600 extending from a contact SP*a* to conductor 29′ of the Breese et al. patent which extends through the supervisory control equipment to the reset control relay 600.

An operating circuit for the guard relay SP is provided in order to make the guard relay normally energized when the supervisory control equipment is in a normal or reset condition. This circuit extends from positive through armature and back contact **670′*d* of the group stop relay which operates at the end of sending a group-selection code, armature and back contact 650′*c* of the group-check relay which stops the sending of pulses to end the sending of the group-check code, armature and back contact 640′*g* of the point-stop relay which stops sending the pulses at the end of the point-selection code, back contact 624′*g* of the point-check relay which stops the sending of pulses at the end of the point-selection check code, back contact 610′*f*** of the operation code control relay which stops the sending of pulses at the end of an operation code, through the winding of the guard relay SP to negative. A holding circuit for the guard relay SP is provided in parallel with the circuit just traced through armature and front contact of the receiving control relay 370', namely contact 370'e so as to prevent drop out of the guard relay during receiving of code signals.

Other holding circuits for the guard relay SP are provided in shunt with the group stop relay contacts 670'd through front contact and armature 660'a of the group code relay 660' which operates when the group-selection check code is received to lock up the selected group. A similar holding circuit for the guard relay SP is provided through front contact 630'e of the point code relay 630' which is energized when the point selection check code is received. Another holding circuit is provided about the contacts of the point check relay 624' and the operation code control relay 610' through front contact 280'a of the supervision control relay 280' which operates on termination of the supervision code to connect the coding chain of the supervisory control apparatus to the indicating control relays for indicating the operating conditions of apparatus at the remote station.

In order to facilitate overall description of the operation of the supervisory control apparatus at the dispatching or control station, a selection key 104 is shown as representing any of a plurality of such selection keys which may be used to initiate selection and operation of apparatus at the remote substation. The trip and close keys 406 and 408 together with their circuit connections as in the Breese et al. patent, are likewise shown, together with a line relay 630 and the impulse sending relay 665, the circuitry of these elements being unchanged from that shown in the Breese et al. patent. The apparatus which is at the dispatching office or control station of FIG. 1 is connected to the apparatus at the remote station by a signal channel represented by the line conductors 85 and 86 which are identical with the corresponding conductors in the Breese patent.

At the remote substation shown in FIG. 2, the trip and close relays 1280 and 1281 for operating a breaker or the like, in response to operation of the selection key 104 and either the trip key 406 or close key 408, are shown merely to facilitate the overall description and, along with the breaker auxiliary switch 1282, are unchanged from their showing in the Breese et al. patent. Likewise, the line relay 1000 and the impulse sending relay 1010 are shown exactly as in the Breese et al. patent and their connections to the line conductors 85 and 86 being exactly as described therein.

A guard relay SP substantially identical with the time-delay relay SP at the dispatching office is provided at the remote substation. An operating circuit for the reset control relay 845 in the remote substation is provided through armature and back contact SPa of the guard relay SP whenever the guard relay is deenergized for a predetermined time. As described in connection with the operation of the guard relay SP at the dispatching office an energizing circuit is provided for normally maintaining the guard relay SP energized when the supervisory control equipment is not at normal reset condition. This circuit is substantially identical to that described in connection with the guard relay SP of FIG. 1 and extends through contacts of supervisory control relays corresponding to those of FIG. 1 as follows. From a positive through armature and back contact 1090'b of the group stop relay 1090', armature and back contact 1070'e of the group check relay 1070', armature and back contact 1060'a of the point stop relay 1060', back contact and armature 1040'a of the point check relay 1040', back contact 1020'a of the supervision code control relay 1020' through the operating winding of guard relay SP to negative.

A parallel holding circuit is provided through front contact 825'd of the receiving control relay 825' for maintaining an operating circuit for the guard relay during the receipt of coded signals. Individual holding circuits are also provided in connection with the group stop relay 1070' through armature and front contact 1080'b of the group code relay 1080'; in connection with the group check relay and the point stop relay through front contact 1050'a of the point code relay 1050'; and in connection with the point check relay and the supervision control relay throughfront contact 886'a of the operation control relay 886'.

In selecting a point at the remote substation, a selection key such as the key 104 may be operated causing the impulse sending relay 665 to operate to repeatedly energize the line conductors 85 and 86 and sending a group-selection code for the particular point in the usual manner. Considering first the operation at the dispatching office, the group stop relay 670 energizes at the end of the group selection code to interrupt the energizing circuit for the guard relay SP at back contact 670'd. The guard relay being of the delayed drop out type does not open immediately, but commences its timing operation. In the normal course of events before the guard relay SP drops out, a group-selection check code will be received or will start to come in from the remote substation and the receiving control relay 370' is energized to maintain a holding circuit for the guard relay at front contact 370'e. As soon as the group-selection check code is completed, the receiving control relay 370' opens but in the meantime the group code relay 660' must be energized to maintain an energizing circuit for the guard relay SP at front contact 660'a. The point-selection code is thereupon transmitted by the dispatching office supervisory control apparatus and at the termination of this code, the point stop relay 640' is energized opening the energizing circuit for the guard relay SP at back contact 640'g so that the guard relay again begins to time out. In the normal course of events, before the guard relay SP drops out, a point-selection check code will start to come in from the substation so that the receiving control relay 370' is again energized to maintain an energizing circuit for the guard relay SP. As soon as the point-selection check code is completed, relay 370' is deenergized but the circuit for the relay SP is maintained by the point code relay 630' which is energized at the end of the point-selection check code. A control code is thereupon transmitted to the remote substation by operating either the trip or close control keys 406 and 408. At the end of the control code, an operation code control relay 610' is energized to interrupt the energizing circuit for the guard relay SP at back contact 610'f. Before the guard relay SP can open, a supervision code will normally be received from the remote substation and the receiving control relay 370' will again be energized to maintain a holding circuit for the guard relay. At the end of the supervision code, the receiving control relay is deenergized but in the meantime, the supervision control relay 280' operates and maintains an energizing circuit for the current relay SP the armature and front contact 280'a. Normal reset of the supervisory control equipment will be effected in the usual manner at the end of the supervisory control operation resulting in deenergization of relays 670', 660', 640', 630', 610', and 280' so as to restore the normal energizing circuit for the guard SP and can be energized to prevent operation thereof to energize the reset control relay 600 through operation ofthe guard relay .

If instead of the above-described normal sequence, any one of the codes had not been completed within a predetermined time after sending of the preceding code, the guard relay SP will time out and energize the reset control relay 600 so as to effect transmission of the usual long reset pulse to reset the apparatus at both stations.

For an operation initiating at the remote substation the sequence would be as follows. In response to receipt of a group-selection code from the substation, the dispatching office transmits a group-selection check code and at the termination of this code, the group check relay 650' operates to interrupt the energizing circuit for the guard relay SP at back contact 650'c. The guard relay SP commences to time out, but in the normal sequence, a point-selection code will start to come in from the remote substation following transmission of the group-selection check code and the receiving or control relay 370' will be energized to maintain a holding circuit for the guard relay SP at front contact 370'*e*. At the end of the point selection code, the point code relay 630' operates and provides a holding circuit through contacts 630'*e*, for the guard relay, about the open contact 650'*c*.

The control station thereupon transmits a point-selection check code in the usual manner at the end of which the point check relay 624' is energized and again opens the energizing circuit for the guard relay SP, this time at the back contacts 624'*g*. The guard relay commences to time out but reset of the supervision code in the normal sequence effects operation of the receiving control relay 370' to maintain the energizing circuit for the guard relay at front contact 370'*e*. At the end of the supervision code the supervision control relay 280' operates and maintains an energizing circuit for the guard relay SP at front contact 280'*a* when the receiving control relay is deenergized due to termination of the supervision code. Reset of the supervision equipment is effected at the end of the operation in the normal manner as described in the Breese et al. patent.

From the above description and accompanying drawings, it will be apparent that we have provided in a simple and effective manner for added security against interference and false operation of supervisory control equipment since analysis and study of operating experience has shown that such equipment is susceptible to false operation by noise pulses in the signal channel if, because of equipment or channel failure, a response is not received from the other station following the transmission of a code from one station. This failure to receive a response would leave the receiving station indefinitely in a receiving condition where it is susceptible to false operation by noise pulses. This situation is especially serious, when it is due to a channel outage on a microwave or frequency shift carrier system, and such types of channels are widely used. Apparatus embodying the features of our invention provides for much more satisfactory operation of such equipment.

The application of apparatus embodying our invention greatly improves the reliability and performance of such supervisory control equipment.

By making the supervisory control equipment so as to be continuously in a condition of trying to reset itself unless a succeeding or responding code is received within a predetermined time, such equipment is rendered much less susceptible to operation from noise pulses and other transients on the signal channel.

Since certain changes may be made in the above-described apparatus and different embodiments of the invention may be made without departing from the spirit and scope thereof, it is intended that all the matter contained in the above description and shown in the accompanying drawings, shall be considered as illustrative and not in a limiting sense.

We claim as our invention:

1. Supervisory control apparatus comprising an impulse sending relay, control means for effecting operation of the sending relay to transmit group-selection, point-selection and operation codes including stop relays for each code, a reset control relay operable to release the apparatus to a normal reset condition, a guard relay operated by the stop relays to effect operation of the reset control relay after a predetermined time, and receiving means including stop relays operated at the end of group and point-selection check codes, said last-mentioned stop relays being connected to render the guard relay ineffective.

2. In a supervisory system adapted for remote control purposes having at least a first and second station, each of said stations including equipment for transmitting and receiving coded signal impulses over an interconnecting signal channel to selectively operate controlled units disposed at each station, each selective operation including the transmission by the initiating one of the stations of a group of impulses which identify the presently operable one of the units, the return by the other station of a group of check-back impulses which indicate the unit identified, the transmission by the initiating station of an operating signal, and the return of a signal indicating the operation has been performed, reset control means operable to restore the equipment to a normal reset condition, a guard relay operable after a predetermined time to effect operation of the reset control means, supervisory control relays operable only at the end of the selection and control codes to effect operation of the guard relay, and supervisory means operated by the receipt of selection-check and supervision signals within said predetermined time to prevent operation of the guard relay.

3. Supervisory control appartus at one station including sending and receiving relays operable to transmit and be operated by coded signals, control relays operated at the end of selection and operation signals transmitted, reset means operable to restore the supervisory control apparatus to a normal rest condition, guard means activated by at least one of said control relays to effect operation of the reset means at the end of a predetermined interval of time, relay means operated by an incoming signal to render the guard means ineffective during receipt of said signal, and additional control means operated at the end of incoming selection, check and supervision signals to render the guard means ineffective.

References Cited in the file of this patent

UNITED STATES PATENTS

| | | |
|---|---|---|
| 1,983,513 | Kempster | Dec. 4, 1934 |
| 2,409,696 | Lewis | Oct. 22, 1946 |
| 2,417,376 | Newman | Mar. 11, 1947 |
| 2,424,571 | Lang | July 29, 1947 |
| 2,444,243 | Breese | June 29, 1948 |
| 2,616,959 | Breese et al. | Nov. 4, 1952 |
| 2,629,088 | Kendall | Feb. 17, 1953 |
| 2,658,188 | Malthaner et al. | Nov. 3, 1953 |
| 2,901,728 | Breese | Aug. 25, 1959 |
| 2,942,238 | Eckhardt et al. | June 21, 1960 |